(12) United States Patent
Castellucci, Sr.

(10) Patent No.: US 11,851,901 B2
(45) Date of Patent: Dec. 26, 2023

(54) HONEYCOMB STRUCTURES AND CLAMP FOR SAME

(71) Applicant: Mark Castellucci, Sr., Napa, CA (US)

(72) Inventor: Mark Castellucci, Sr., Napa, CA (US)

(*) Notice: Subject to any disclaimer, the term of this patent is extended or adjusted under 35 U.S.C. 154(b) by 417 days.

(21) Appl. No.: 17/232,841

(22) Filed: Apr. 16, 2021

(65) Prior Publication Data
US 2021/0324652 A1   Oct. 21, 2021

Related U.S. Application Data

(60) Provisional application No. 63/011,042, filed on Apr. 16, 2020.

(51) Int. Cl.
| | |
|---|---|
| *E04H 12/12* | (2006.01) |
| *H02G 7/20* | (2006.01) |
| *C09D 121/00* | (2006.01) |
| *C08K 3/04* | (2006.01) |
| *C09D 117/00* | (2006.01) |

(Continued)

(52) U.S. Cl.
CPC ............ *E04H 12/12* (2013.01); *C08K 3/04* (2013.01); *C08K 5/32* (2013.01); *C09D 117/00* (2013.01); *C09D 121/00* (2013.01); *H02G 7/20* (2013.01); *C08L 23/06* (2013.01); *C08L 2207/062* (2013.01)

(58) Field of Classification Search
CPC .. E04H 12/12; C08K 3/04; C08K 5/32; C09D 117/00; C09D 121/00; H02G 7/20; C08L 23/06; C08L 2207/062
USPC .......................................................... 52/294
See application file for complete search history.

(56) References Cited

U.S. PATENT DOCUMENTS

| | | | |
|---|---|---|---|
| 6,322,863 B1 | 11/2001 | Kubicky | |
| 6,453,635 B1 * | 9/2002 | Turner | ................... B29C 70/52 52/848 |

(Continued)

FOREIGN PATENT DOCUMENTS

| | | | |
|---|---|---|---|
| CN | 204152288 | | 2/2015 |
| CN | 205355748 | * | 6/2016 |
| CN | 212956275 | | 4/2021 |

(Continued)

OTHER PUBLICATIONS

European Patent Application No. 21202513.4. "European Search Report" dated Jun. 30, 2022. 12 pages.

*Primary Examiner* — Mark R Wendell
(74) *Attorney, Agent, or Firm* — Hinshaw & Culbertson LLP; Roger M. Masson, Esq.

(57) ABSTRACT

A utility or marine pole comprises a honeycomb core having an outer surface and a rubber coating on substantially all of the outer surface of the core. The core has a length of from about 12 feet to about 30 feet and a circumference of from about 5 inches to about 15 inches. A bracket for a pole used for supporting wires, the bracket comprising a body being circular in horizontal cross section, means for adjusting the diameter of the body, and a lateral extension having a first end portion supported by the body and an opposed second end portion, wherein the second end portion has an opening for receiving a wire. A railroad crossing section comprising a honeycomb core has a circumferential outer surface and being rectangular in vertical cross section and a rubber coating on substantially all of the outer surface of the core.

40 Claims, 3 Drawing Sheets

(51) Int. Cl.
  *C08K 5/32* (2006.01)
  *C08L 23/06* (2006.01)

(56) References Cited

U.S. PATENT DOCUMENTS 10,703,909 B1 * 7/2020 Nystrom ................ C08G 18/48
2020/0208369 A1 7/2020 Porter

FOREIGN PATENT DOCUMENTS

JP 2005522532 * 7/2005
JP 3898353 * 3/2007
KR 20060030491 4/2006

* cited by examiner

HONEYCOMB STRUCTURES AND CLAMP FOR SAME

CROSS-REFERENCE TO RELATED APPLICATIONS

This application claims priority to U.S. Provisional Patent Application No. 63/011,042, titled "Honeycomb Structures and Clamp for Same," filed Apr. 16, 2020, the contents of which are incorporated by reference herein in their entirety.

BACKGROUND

There is a need for utility and marine poles that are light weight, long lived, low cost, and fire resistant. Similarly, there is a need for railroad crossing sections having the same features.

SUMMARY

The present invention is directed to poles and crossing pieces that satisfy these needs. In a first embodiment, the present invention is directed to a pole comprising a honeycomb core having an outer surface, and a rubber coating on substantially all of the outer surface of the core.

If the pole is a utility pole, the core can have a length of from about 20 feet to about 30 feet and a circumference of from about 5 inches to about 15 inches. The coating can have a thickness of about 1 inch to about 5 inches. Optionally, the pole has a length of from about 24 feet to about 30 feet. The circumference of the honeycomb core can about 10 inches, and the coating can have a thickness of about 2 inches.

If the pole is a marine pole, the honeycomb core can have a length of from about 12 feet to about 20 feet and a circumference of from about 5 inches to about 15 inches, and the rubber coating can have a thickness of about 0.5 inches. Optionally, the honeycomb core has a circumference of about 8 inches.

The pole can be used as a pole for wires and the pole can be in the shape of a right cylinder.

The pole can further comprise a bracket coupled to the outer surface of the core and the bracket can have lateral extension supporting at least one wire. The lateral extension can be from about 12 inches to about 24 inches long.

The rubber coating can comprise ground up rubber tire with a binder, or optionally, crumb rubber of 10-20 mesh with a binder. If the rubber is crumb rubber, the rubber can comprise a methylene diphenyl diisocyanate binder and preferably comprises about 90-95% by weight rubber and about 5-10% by weight binder.

Optionally, the honeycomb core itself can comprise ground up rubber tire with a binder.

Optionally, the honeycomb core and the rubber coating comprises 60% by weight crumb rubber, 35% by weight high density polyethylene, and 5% by weight carbon black.

The pole can further comprise a fire retardant and the fire retardant can be antimony aluminate hydrate.

In a second embodiment, the present invention is directed to a bracket for a pole used for supporting wires. The bracket comprises a body, a means for adjusting the diameter of the body, and a lateral extension. The body can be circular in cross section and the lateral extension has a first end portion supported by the body and an opposed second end portion, wherein the second end portion has an opening for receiving a wire.

The bracket can be made from aluminum.

In a third embodiment, the present invention is directed to a railroad crossing section comprising a honeycomb core having a circumferential outer surface, and a rubber coating on substantially all of the outer surface of the core. The honeycomb core is rectangular in vertical cross section, has opposed ends, has a length of from about 6 feet to about 15 feet, has a width of from about 12 inches to about 30 inches, and a thickness of from about 4.5 inches to about 6.5 inches. The coating has a thickness of from about 1 inch to about 5 inches.

The length of the crossing section can be from about 78 inches to about 156 inches with a width of from about 14 inches to about 27 inches and a thickness of from about 4.5 inches to about 6.5 inches.

DRAWINGS

These and other features, aspects, advantages of the present invention will become understood with regard to the following description, and the accompanying drawings, wherein.

DESCRIPTION

Figures 1, 2:
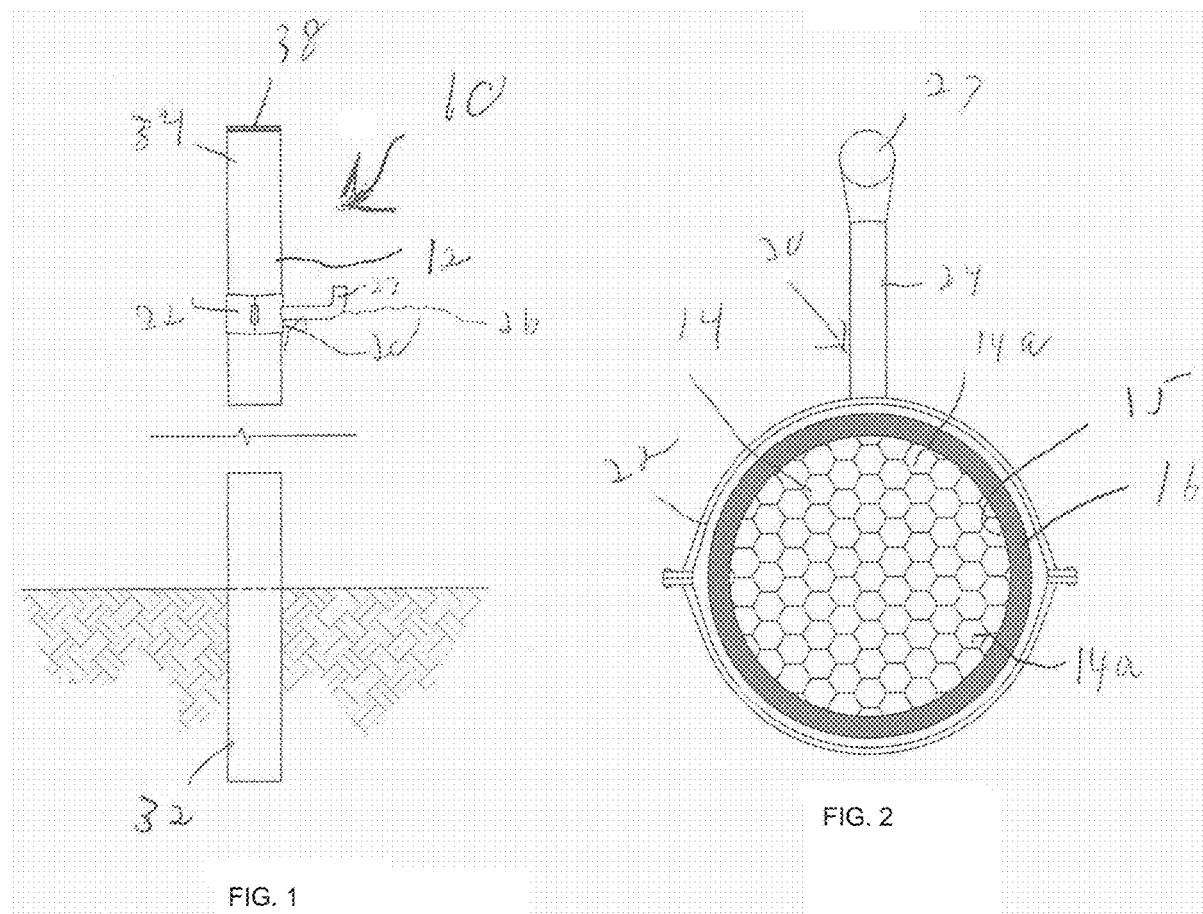
FIG. 1 is a broken front elevation view of a utility pole having features of the present invention.
FIG. 2 is a horizontal sectional view of the utility pole of FIG. 1 taken on line 2-2 in FIG. 1.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any device or part of a device disclosed in this disclosure will be determined by its intended use.

Referring now to the drawings, wherein like reference numerals designate identical or corresponding features throughout the several views. Further, described herein are certain non-limiting embodiments of my invention.

Referring now to FIGS. 1 and 2, there is shown a utility pole system 10 that comprises a utility pole 12 having a honeycomb core 14 with an outer circumferential surface 15 and a coating 16 on the outer surface 15. The pole 12 has a length of from about 20 to about 30 feet and has a circumference of about 5 to about 15 inches, preferably about 10 inches. The honeycomb core 14 comprises a plurality of cells 14a, and each cell 14a of the core 14 is hexagonal in horizontal cross section with a distance across opposed corners of about ¾ inch with the walls being about ¼ inch thick.

The coating 16 is on substantially all of the outer surface 15 of the core 14. The coating comprises rubber and has a thickness of about 1 inch to about 5 inches, and preferably about 2 inches.

This system 10 optionally comprises a bracket 20 coupled to the outside of the pole 12. The bracket 20 comprises a band 22 around the circumference of the pole 12 with a lateral extension 24 of about 12 inches to about 24 inches in length, and preferably about 18 inches. Extension 24 has an end portion 26, and at the end portion 26 of the extension 24 there is a holder comprising an upwardly extending arm 27 for supporting wires and cables (not shown). The arm 27 can also comprise an opening for receiving a wire. The bracket 20 can be made of aluminum or an engineering plastic.

The bracket band 22 size can be adjusted and the bracket 20 can be tightened on the pole 12 using mechanisms known for tightening hose clamps, such as a worm-drive mechanism, spring, a wire clamp, compression fittings, and push-fittings.

The pole 12 has opposed ends portions forming a bottom portion 32 and an opposed top portion 34. In use, about six feet of the bottom portion 36 of the pole 12 can be placed in a hole in the ground or other device as support, and the top portion 34 of the pole 12 can have a plastic cap 38. Preferably the plastic cap 38 is made of high-density polyethylene to keep moisture out of the honeycomb core 14. There also can be a cap (not shown) on the bottom portion 32 of the pole 12.

As can be seen from the Figures, the shape of the pole 12 is a right cylinder.

Optionally the top and bottom portions 32, 34 of the pole 12 are not coated, for a length of about 1½ inches.

The rubber used for the honeycomb core 14 and in the rubber coating 16 preferably is crumb rubber, which is recycled rubber produced from scrap automobile and truck tires. During the recycling process, steel and the tire cord are removed, leaving tire rubber with a granular consistency. A preferred crumb rubber is of 10-20 mesh with a moisture content of about 0.07% by weight. More preferably, the honeycomb core 14 and the rubber coating 16 are formed from a composition comprising 60% by weight 10-20 mesh crumb rubber, 35% by weight plastic, and 5% by weight carbon black.

However, it should be noted that the carbon black is not absolutely necessary, and the honeycomb core 14 and the rubber coating 16 can be formed from a composition comprising 60% by weight 10-20 mesh crumb rubber and 40% by weight plastic. If no carbon black is used in the composition, then the crumb rubber utilizes a binder to hold the crumb rubber together. A preferred binder is a polyurethane based binder such as one based on methylene diphenyl diisocyanate ("MDI"). An MDI prepolymer known to be useful for rubber granules is available from Ryvec Inc. of Anaheim, CA under the tradename MD-400. It is a polyurethane prepolymer which typically is cured with moisture. Before cure, the coating comprises from about 90% to 95% by weight crumb rubber and about 5% to about 10% by weight binder. Accordingly, the binder is only utilized when carbon black is not added to the composition.

The plastic that is used is high density polyethylene (HDPE) and is heated so that it is in a liquid form when it is introduced to the crumb rubber.

Carbon black is a material produced by the incomplete combustion of heavy petroleum products such as FCC tar, coal tar, or ethylene cracking tar. Carbon black is a form of paracrystalline carbon that has a high surface-area-to-volume ratio, albeit lower than that of activated carbon. Preferably, the carbon black that is used in the present invention is recycled carbon black that is sourced from processing old tires. Carbon black is a beneficial component of the present invention because it provides a structural benefit and increases the strength of the composition, functioning much in the same way as a concrete.

The pole 12 can contain a fire retardant, at a percent weight from about 2% to about 3% by weight of the composition. A preferred fire retardant is antimony aluminate hydrate.

There are other applications of the poles 12 of the present invention, such as marine applications where they can be used as pilings, house pilings columns, retaining walls, barn poles, and sign poles. For typical marine applications, the length of the pole 12 is from about 12 to about 20 feet with a circumference of about 5 to about 15 inches, more typically about 8 inches, and the rubber coating 16 has a thickness of about ½ inch.

Figure 3:
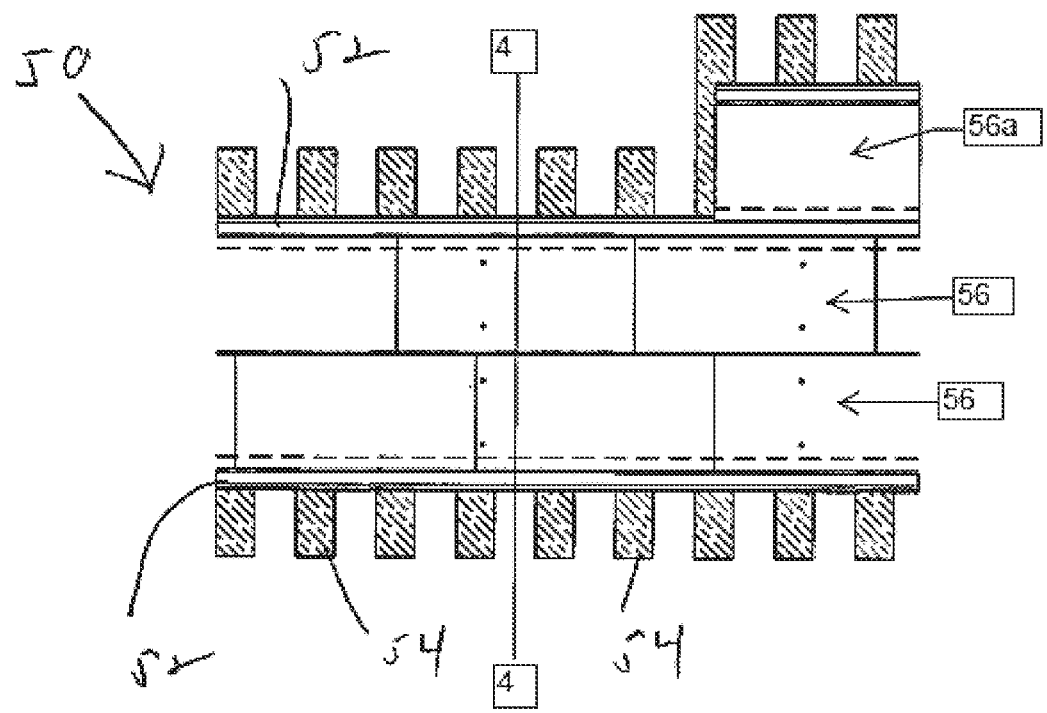
FIG. 3 is a top plan view of a railroad crossing using crossing sections of the present invention.
Figure 4:
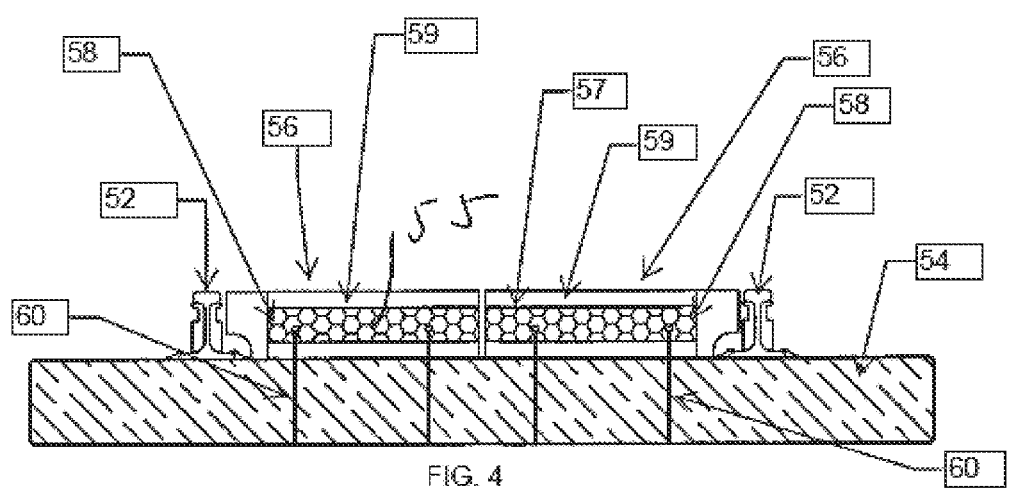
FIG. 4 is a horizontal sectional view of the crossing of FIG. 3 taken along line 4-4 in FIG. 3.

With regard to FIGS. 3 and 4, the concept of the present invention can be used for railroad crossings. FIG. 3 shows top plan view of a typical railroad track crossing 50 that comprises two parallel elongated steel rails 52 at a fixed distance apart (gauge) connected to each other by railroad ties 54 underneath the tracks/rails 52 with a longitudinal axis perpendicular to the longitudinal axis of the rails 52. Typically, the ties 54 are set in loose gravel or ballast. Between the rails 52 and on top of the ties 54 are a plurality of crossing pieces 56. There can also be crossing pieces 56a outside of the rails 52.

FIG. 4 shows a cross-sectional view of the railroad crossing 50 of FIG. 3, taken along line 4-4. The crossing pieces 56 have features of the present invention, in that like the poles 12, they comprise a honeycomb core 55 having an outer surface 57 and opposed ends 58. There is a rubber coating 59 with a binder on substantially all the outer surface 57 of the core 55. The length of the crossing pieces 56 is from about 6 feet to about 15 feet, preferably about 78 inches to about 156 inches, a width of about 14 inches to about 27 inches, and a thickness of about 4.5 inches to about 6.5 inches. The crossing pieces 56 are rectangular in cross section and are fastened to the rails with fasteners such as bolts 60.

Preferably, the honeycomb core 55 and the rubber coating 59 are formed from a composition comprising of 60% by weight 10-20 mesh crumb rubber, 35% by weight plastic, and 5% by weight carbon black. However, it again should be noted that the carbon black is not absolutely necessary, and the honeycomb core 55 and the rubber coating 59 can be formed from a composition comprising 60% by weight 10-20 mesh crumb rubber and 40% by weight plastic. In this instance, the composition utilizes a binder as discussed above with respect to the poles 12.

Figure 5:
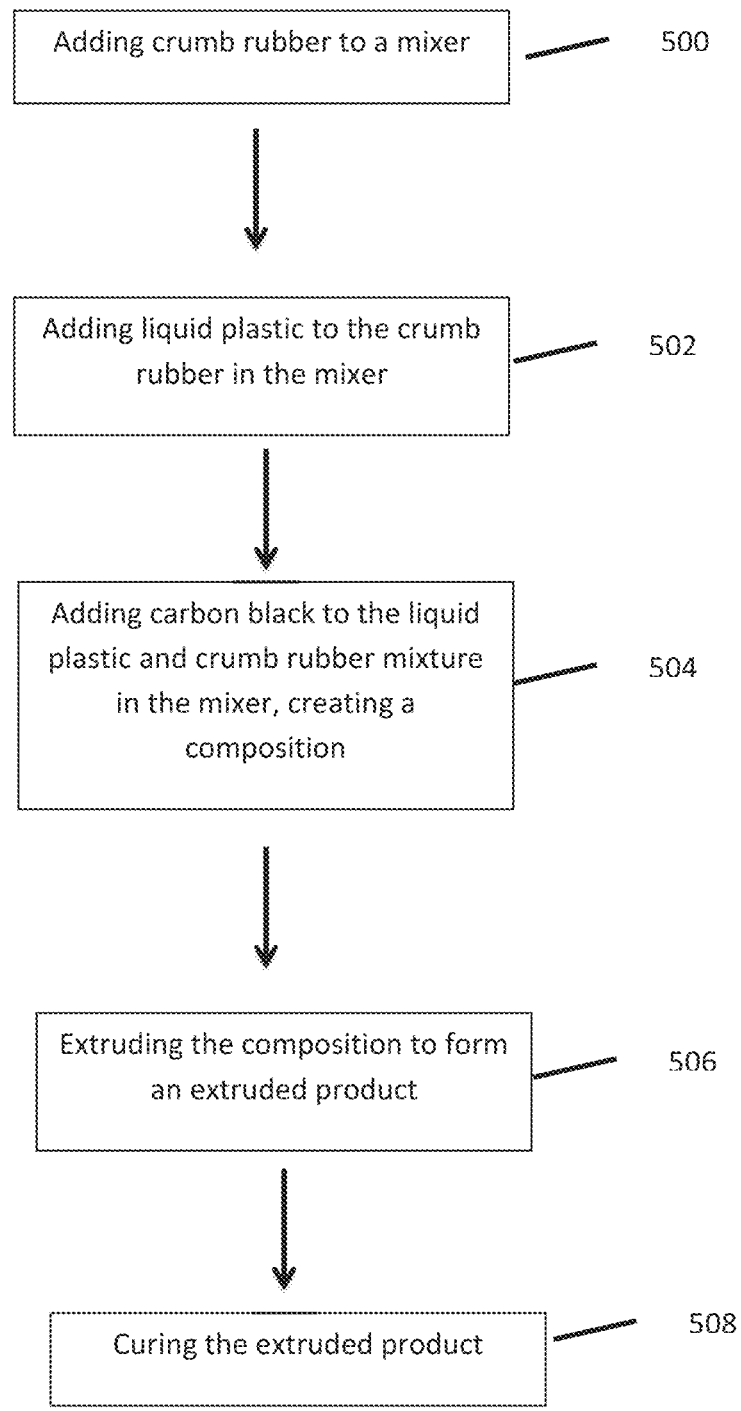
FIG. 5 is a flow chart depicting a method of making a composition used to form the utility pole of FIG. 1 and the crossing sections of FIG. 3.

Referring now to FIG. 5, there is shown a method of making the products (poles 12, crossing pieces 56, etc.) of the present invention. To make the composition that the products 12, 56 are made out of, the 10-20 mesh crumb rubber is added to a Banbury mixer 500. The Banbury mixer resembles a robust dough mixer in that two interrupted spiral rotors move in opposite directions at 30 to 40 rotations per minute.

Next, HDPE plastic, which has been heated so that it is in liquid form, is injected into the mixer and allowed to mix with the crumb rubber 502. The mixer is continuously heating the mixture to about 220 degree Fahrenheit so that the mixture maintains an extrudable form and all of the components can adequately mix.

And finally, the carbon black, if desired, is added to the crumb rubber/plastic mixture 504. Typically, the carbon black is in the form of a dry powder.

An extruder is coupled to the mixer so that once all of the components are mixed, the composition is then extruded to form the desired product 506.

Due to the configuration of both the mixer and the extruder, both the process of mixing and the process of extruding function together, as one continuous process, with additional amounts of crumb rubber, HDPE and carbon black added as needed.

It is important to note that the pole 12 and crossing pieces 56 of the present invention are formed without vulcanizing the composition that is used to form them. This is significant because it avoids the negative environmental effects associated with vulcanizing, such as the discharge of chemicals into the air and surrounding environment. Thus, the poles 12 and crossing pieces 56 of the present invention are environmentally friendly as they not only utilize recycled products, but do not involve vulcanizing.

Additionally, the products 12, 56 are sustainable in that if they are damaged over their lifetime, the products 12, 56 can be recycled to form new products 12, 56.

As noted above, the pole 12, including the honeycomb core 14 and the coating 16, can be formed in a single step by extruding the composition through a die. Curing 508 is effected by heating the die, typically 180 degrees Fahrenheit or higher, wherein the combination of the heat and pressure from the die cures the rubber composition. Before curing, the rubber contains about 0.2% by weight water. A higher water content results in a harder rubber. This same curing step also applies to the crossing pieces 56.

The present invention has the following features:

A A utility pole comprising:
a honeycomb core having a length of from about 20 to about 30 feet and a circumference of from about 5 to about 15 inches, the core having an outer surface; and
a coating on substantially all of the outer surface of the core, the coating comprising rubber and having a thickness of about 1 to about 5 inches.

A-1 The pole of feature A used as a pole for wires.

A-2 The pole of feature A-1 with a bracket on the outside of the core, the bracket having a lateral extension supporting at least one wire.

A-3 The pole of feature A-2 wherein the lateral extension is from about 12 to about 24 inches long.

A-4 The pole of feature A in the shape of a right cylinder.

A-5 The pole of feature A wherein the rubber coating comprises ground up rubber tire with a binder.

A-6 The pole of feature A including a fire retardant.

A-7 The pole of feature A-6 wherein the fire retardant is antimony aluminate hydrate A-8 The pole of feature A wherein the circumference of the core is about 10 inches.

A-9 The pole of feature A wherein the thickness of the rubber coating is about 2 inches A-10 The pole of feature A wherein the rubber comprises crumb rubber of 10-20 mesh with a binder.

A-11 The pole of feature A-10 wherein the rubber comprises an MDI binder.

A-12 The pole of feature A-11 wherein the rubber comprises about 90-95% rubber and about 5-10% binder.

A-13 The pole of feature A wherein the pole has a length of about 24 to about 30 feet.

A-14 The pole of feature A-5 wherein the honeycomb core comprises ground up rubber tire with a binder.

B-1 A marine pole comprising:
a) a honeycomb core having a length of from about 12 feet to about 20 feet and a circumference of from about 5 to about 15 inches, the core having an outer surface; and
b) a coating on substantially all of the outer surface of the core, the coating comprising rubber and having a thickness of about ½ inch.

B-2 The pole of feature B-1 wherein the core has a circumference of about 8 inches.

C-1 A bracket for a pole used for supporting wires, the bracket comprising a body being circular in horizontal cross section, means for adjusting the diameter of the body, and a lateral extension having a first end portion supported by the body and an opposed second end portion, the second end portion having an opening for receiving a wire.

C-2 The bracket of feature C-1 made of aluminum.

D-1 A railroad crossing section comprising:
a) a honeycomb core having opposed ends and a length of from about 6 feet to about 15 feet and a width of from about 12 to about 30 inches and a thickness of about 4½ to about 6½ inches, the core having a circumferential outer surface and being rectangular in vertical cross section; and
b) a coating on substantially all of the outer surface of the core, the coating comprising rubber and having a thickness of about 1 to about 5 inches.

D-2 The track of feature D-3 wherein the length of the crossing section is about 78" to about 156" with a width at 14 to about 27 inches and a thickness of about 4½" to about 6½".

While particular forms of the invention have been illustrated and described, it will also be apparent to those skilled in the art that various modifications can be made without departing from the spirit and scope of the invention.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

What is claimed is:

1. A utility pole comprising:
   a) a core having the form of a solid cylinder and a honeycomb structure throughout the cylinder, the core having a length of at least about 20 feet; and
   b) an outer layer around the core, the outer layer comprising rubber and having a thickness of about 1 inch to about 5 inches, wherein the pole comprises crumb rubber and high density polyethylene.

2. The pole of claim 1, further comprising a bracket coupled to the outer layer, the bracket having a lateral extension supporting at least one wire.

3. The pole of claim 2, wherein the lateral extension is from about 12 inches to about 24 inches long.

4. The pole of claim 1, wherein the pole is in the shape of a right cylinder.

5. The pole of claim 1, wherein the outer layer comprises ground up rubber tire with a binder.

6. The pole of claim 5, wherein the core comprises ground up rubber tire with a binder.

7. The pole of claim 1, further comprising a fire retardant.

8. The pole of claim 7, wherein the fire retardant is antimony aluminate hydrate.

9. The pole of claim 1, wherein the diameter of the honeycomb core is about 9⅜ inches wide.

10. The pole of claim 1, wherein the thickness of the outer layer is about 2 inches.

11. The pole of claim 1, wherein the outer layer comprises crumb rubber of 10-20 mesh with a binder.

12. The pole of claim 11, wherein the binder in the outer layer comprises a methylene diphenyl diisocyanate binder.

13. The pole of claim 12, wherein the outer layer comprises about 90-95% rubber and about 5-10% binder.

14. The pole of claim 1, wherein the pole has a length of from about 24 to about 30 feet.

15. The pole of claim 1, wherein the core and the outer layer comprises 60% by weight crumb rubber, 35% by weight high density polyethylene, and 5% by weight carbon black.

16. The pole of claim 1, wherein the outer layer has a length of no more than about 30 feet.

17. A marine pole comprising:
a) a core having the form of a solid cylinder and a honeycomb structure, the core having a length of from about 12 feet to about 20 feet; and
b) an outer layer around the core, the outer layer comprising rubber and having a thickness of about 0.5 inches, wherein the pole comprises crumb rubber and high density polyethylene.

18. The pole of claim 17, wherein the marine pole is formed without vulcanizing the crumb rubber.

19. A railroad crossing section comprising:
a) a core having opposed ends and a length of from about 6 feet to about 15 feet and a width of from about 12 inches to about 30 inches and a thickness of from about 4.5 inches to about 6.5 inches, the core being rectangular in vertical cross section, the core having a honeycomb structure throughout the vertical cross section; and
b) an outer layer around the core, the outer layer comprising rubber and having a thickness of from about 1 inch to about 5 inches, wherein the pole comprises crumb rubber and high density polyethylene.

20. The railroad crossing section of claim 19, wherein the length of the crossing section is from about 78 inches to about 156 inches with a width of from about 14 inches to about 27 inches and a thickness of from about 4.5 inches to about 6.5 inches.

21. A utility pole comprising:
a) a honeycomb core having a length of at least 20 feet, and
b) an outer layer around the core, the outer layer having a thickness of 1 inch to 5 inches, wherein the pole comprises crumb rubber and high density polyethylene.

22. The pole of claim 21, further comprising a bracket coupled to the outer layer, the bracket having a lateral extension supporting at least one wire.

23. The pole of claim 21, further comprising a fire retardant.

24. The pole of claim 21, further comprising carbon black.

25. The pole of claim 21, wherein the core comprises crumb rubber and high density polyethylene.

26. The pole of claim 21, wherein the outer layer comprises crumb rubber and high density polyethylene.

27. A marine pole comprising:
a) a core having a length of at least 12 feet; and
b) an outer layer around the core, the pole comprising crumb rubber and high density polyethylene.

28. The pole of claim 27, wherein the outer layer has a thickness of about 0.5 inches.

29. The pole of claim 27, wherein the core has a length of not more than 20 feet.

30. The pole of claim 27, further comprising a fire retardant.

31. The pole of claim 27, further comprising carbon black.

32. The pole of claim 27, wherein the core comprises crumb rubber and high density polyethylene.

33. The pole of claim 27, wherein the outer layer comprises crumb rubber and high density polyethylene.

34. A railroad crossing section comprising:
a) a honeycomb core having opposed ends and a length of from 6 feet to 15 feet and a width of from 12 inches to 30 inches and a thickness of from 4.5 inches to 6.5 inches, the core having an outer surface and being rectangular in vertical cross section; and
b) an outer layer around the core, the outer layer comprising rubber and having a thickness of from 1 inch to 5 inches, wherein the railroad crossing section comprises crumb rubber and high density polyethylene.

35. The railroad crossing section of claim 34, wherein the length of the crossing section is from 78 inches to 156 inches with a thickness of from 4.5 inches to 6.5 inches.

36. The railroad crossing section of claim 34, wherein the width of the crossing width is from about 14 inches to about 27 inches.

37. The railroad crossing section of claim 34, further comprising a fire retardant.

38. The railroad crossing section of claim 34, further comprising carbon black.

39. The railroad crossing section of claim 34, wherein the core comprises crumb rubber and high density polyethylene.

40. The railroad crossing section of claim 34, wherein the outer layer comprises crumb rubber and high density polyethylene.

* * * * *